United States Patent [19]

Davies

[11] Patent Number: 4,537,297
[45] Date of Patent: Aug. 27, 1985

[54] FRICTION CLUTCH DRIVEN PLATE

[75] Inventor: David A. Davies, Leamington Spa, England

[73] Assignee: Automotive Products plc, Leamington Spa, England

[21] Appl. No.: 457,143

[22] Filed: Jan. 11, 1983

[30] Foreign Application Priority Data

Jan. 13, 1982 [GB] United Kingdom ............... 8200965

[51] Int. Cl.³ .............................................. F16D 3/66
[52] U.S. Cl. ............................ 192/106.2; 192/103 R; 464/68
[58] Field of Search ............ 192/70.17, 103 R, 106.1, 192/106.2; 464/62, 66, 68

[56] References Cited

U.S. PATENT DOCUMENTS

| 2,101,297 | 12/1937 | Swennes | 464/62 |
|---|---|---|---|
| 4,354,586 | 10/1982 | Stanley | 192/106.2 |
| 4,376,477 | 3/1983 | Loizeau | 192/106.2 |
| 4,396,103 | 8/1983 | Loizeau | 192/106.2 |
| 4,406,357 | 9/1983 | Nagano et al. | 192/106.2 |
| 4,433,700 | 2/1984 | Loizeau et al. | 192/106.1 |
| 4,465,172 | 8/1984 | Gatewood | 192/103 R X |
| 4,474,277 | 10/1984 | Loizeau | 192/106.2 |

FOREIGN PATENT DOCUMENTS 1100319 1/1968 United Kingdom .
2056019 3/1981 United Kingdom ............. 192/106.1

Primary Examiner—Rodney H. Bonck
Attorney, Agent, or Firm—Kemon & Estabrook

[57] ABSTRACT

A friction clutch driven plate for motor vehicles is of the kind in which a friction facing carrier assembly is mounted for limited rotation relative to a hub, such limited rotation being controlled by damping springs and a friction damper. Centrifugal control of the friction damper is by a pendulum device in the form of eccentric collars pivoting on stop pins and engaging apertures in an intermediate plate frictionally engaged with the hub. At low rotational speeds the stop pins can move within the collars which can also tilt to allow limited relative rotation between the carrier assembly and the hub with low friction damping. At higher speeds the collars are effectively locked in place to give high friction damping. By suitable arrangement of windows for the damping springs this also has the effect of reducing relative rotation controlled by a low rate spring only required to damp transmission noise during engine idling.

9 Claims, 6 Drawing Figures

FRICTION CLUTCH DRIVEN PLATE

This invention relates to friction clutch driven plates and in particular to such driven plates as are utilized in motor vehicle friction clutches.

In motor vehicle friction clutches it is common for the driven plate to comprise a friction facing carrier assembly which is rotatable about a central hub and for the rotation to be resisted by damping springs acting between the facing carrier and hub. It is also common for the driven plate to be of a type in which a low rate idle damping spring is provided for damping out drive line vibrations when the vehicle is idling and main damping springs are provided for damping out main drive oscillations when the vehicle is being driven. A disadvantage of this type of plate is that, when the vehicle is being driven and the torque load through the drive plate is suddenly reversed, by for example the vehicle going into overrun when the driver removes his foot from the accelerator, vehicle surge occurs when drive is returned. This surge is due in the main to the low rate spring required for idle damping.

Therefore, there are two conflicting requirements:

(a) a low rate spring to damp out drive line vibrations during idling and (b) the desirability of not having excessive movement of the facing carrier assembly relative to the hub during normal drive conditions.

The present invention seeks to provide a friction clutch driven plate which has torsional damping characteristics which vary with rotational speed and which has a simple construction.

According to the present invention there is provided a friction clutch driven plate having a hub, a friction facing carrier assembly mounted for limited rotation relative to the hub, damping springs and a friction damper operative between the carrier assembly and the hub to control such rotation, and centrifugal control means operative to vary the operation of the friction damper with varying rotational speed of the driven plate, wherein the centrifugal control means comprises a pendulum device which is pivotable on the carrier assembly and co-operates with an aperture in an intermediate plate located for frictional engagement with the hub.

The invention will be described by way of example and with reference to the accompanying drawings in which.

Figure 1:
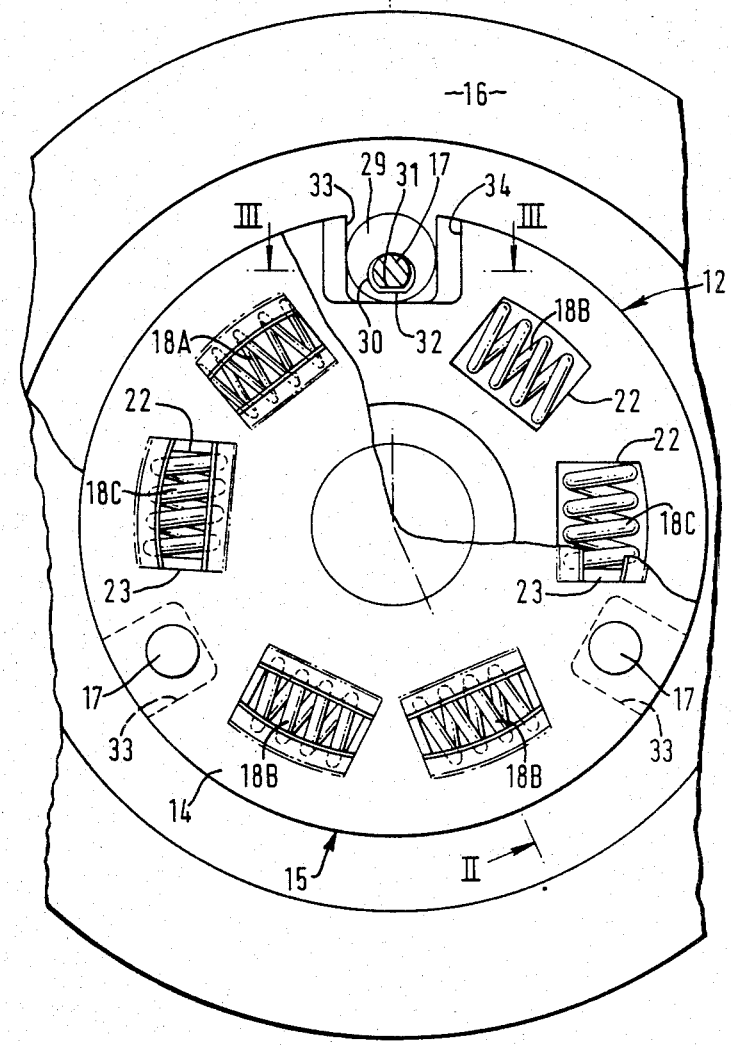
FIG. 1 is an elevation of a friction clutch driven plate according to this invention showing certain components partially cut away.
Figure 2:
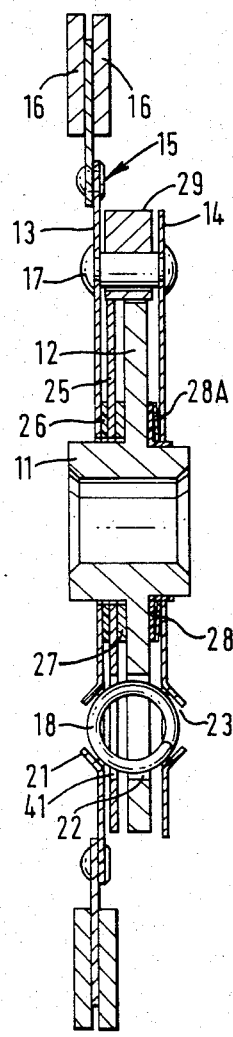
FIG. 2 is a section on the line II—II of FIG. 1.
Figure 3:
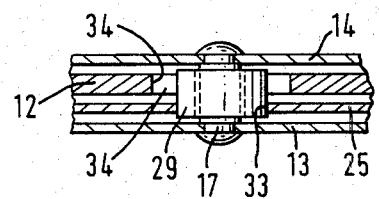
FIG. 3 is a section on the line III—III of FIG. 1.

The clutch driven plate shown in FIGS. 1 to 4 is for a motor vehicle friction clutch and has a hub 11 integral with a hub flange 12. A pair of flanges, namely a friction facing carrier plate 13 and a retainer plate 14, is mounted for rotation on the hub 11, one on each side of the flange, the plates 13 and 14 being secured together by stop pin rivets 17 to form a friction facing carrier assembly 15. Two annular friction facings 16 are mounted on the carrier plate 13 to present friction surfaces in opposite direction. Rotation of the friction facing carrier assembly 15 about the hub 11 is restrained by damping springs 18A, 18B and 18C located in co-operating spring windows, 21, 22 and 23 in the carrier plate 13, the hub flange 12 and the retainer plate 14 respectively.

A friction damper means for controlling relative rotation between the carrier assembly 15 and the hub 11 includes an intermediate annular plate 25 which is also rotatable on the hub 11 and is interposed between the carrier plate 13 and hub flange 12. A low friction bearing washer 26 is located between the facing carrier plate 13 and the intermediate plate 25 and a high friction washer 27 is located between the intermediate plate 25 and the hub flange 12. A low friction bearing washer 28 is located between the other side of the hub flange 12 and the retainer plate 14 and is loaded against the hub flange by a Belleville washer 28A which also provides an axial load on washers 26 and 27.

The cross-section of each of the stop pins 17 is cylindrical with a radially inwardly directed flat surface 31 thereon. Each stop pin 17 is surrounded by centrifugal control means comprising a pendulum device in the form of a loosely fitting collar 29 having a cylindrical outer periphery and a part-circular axial pivot hole 30 which is eccentric to the cylindrical outer surface. The hole 30 incorporates a flat surface 32 that can engage with the flat surface 31 on the stop pin 17. The outer cylindrical surface of each collar 29 is a close running fit in a respective aperture 33 in the outer peripheral margin of the intermediate plate 25 whereas the collars are each accommodated in the outer peripheral margin of the hub flange 12 by respective apertures 34 which are circumferentially elongated to allow for movement of the friction facing carrier assembly 15 relative to the hub 11.

The springs 18A, 18B and 18C are each a snug and fit in respective spring windows 41 in the plate 25 and also are a snug end fit in the hub flange spring windows 22. However, spring 18A is a low rate spring for damping out idling vibrations and is also a snug end fit in its carrier plate and retainer plate windows 21 and 23 so that it resists relative rotation between the friction facing carrier assembly 15, the intermediate plate 25 and the hub flange 12. The springs 18B are of medium spring rate, main damping springs each having the same end clearance in the carrier and retainer plates 13 and 14 and this clearance is less than the corresponding clearances for the other main damping springs 18C which are of high spring rate. Hence when the friction facing carrier assembly 15 is rotated relative to the hub 11 the springs come into operation in the sequence 18A, 18B, 18C.

Figure 5:
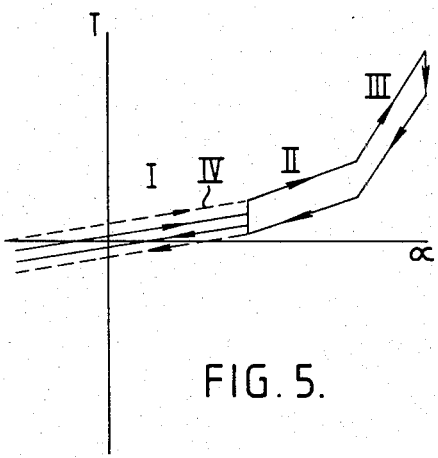
FIG. 5 is a graph of torque load (T) versus angular deflection ($\alpha$) for relative rotation of the facing carrier around the hub for the driven plate of FIg. 1.
Figure 4:
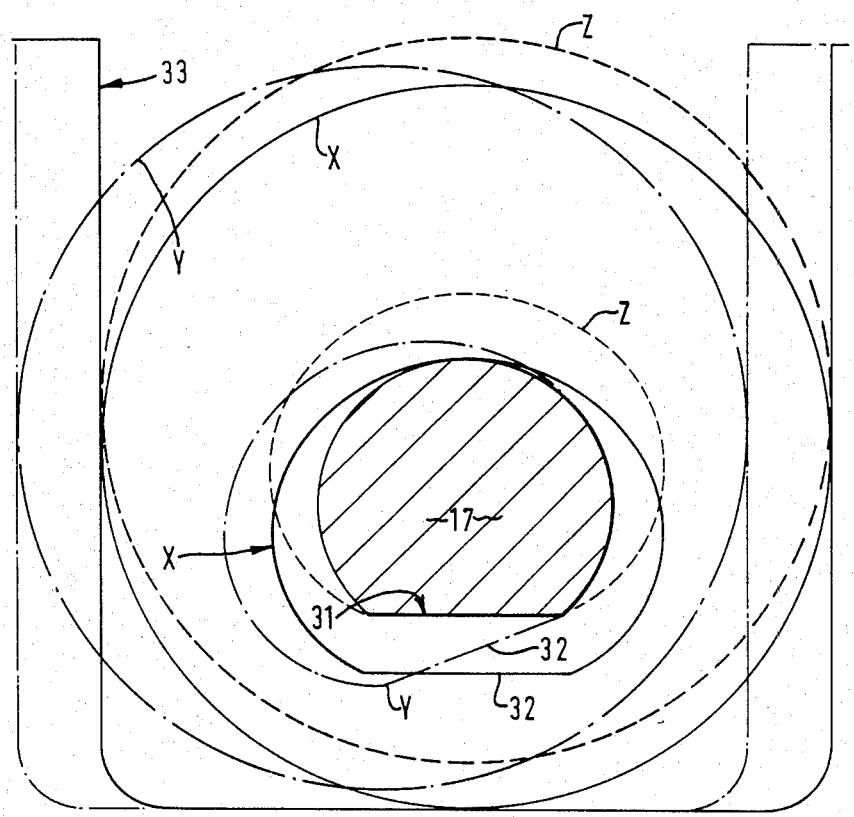
FIG. 4 is an enlarged view showing the relative positions of certain components of the driven plate shown in FIG. 1 during various operating modes.

With particular reference now to FIG. 4 and FIG. 5, if, in use, a torque load is applied to the friction facings 16 to rotate the driven plate clockwise (as seen in FIG. 1), the following sequence of events takes place:

I (a) If the driven plate is idling, i.e. is rotating slowly at approximately 800 revolutions/minute, then in the equilibrium position with no torque load on the facings, the relative positions of the collar 29 and aperture 33 in the intermediate plate 25 are shown in FIG. 4 by the solid lines X and 33, respectively.

(b) If a drive load is now applied to the facings 16, the friction facing carrier assembly 15 rotates clockwise relative to the hub 11 (as seen in FIG. 1). For the initial phase of movement, the friction engagement between the intermediate plate 25 and the hub flange 12 is sufficient to hold the intermediate plate 25 fast with the hub flange, and the stop pins 17 each move within their respective collars 29 to take up the clearance in the holes 30 and cause the collars to pivot to take up the position relative to the stop pins 17 shown by chain-dotted lines Y. This initial phase of rotation of the facing carrier assembly about the hub will have been resisted by the spring 18A and the friction damping between the carrier plate 13 and the intermediate plate 25. This is shown by the portion I of the curve in FIG. 5.

(c) Continued relative clockwise rotation will now result in the intermediate plate 25 being held fast relative to the carrier and retainer plates by the collars 29, and therefore the rotation is now resisted by the further friction damping between the intermediate plate 25 and the hub flange 12, and coincidentally by the springs 18B whose end clearance corresponds to the same initial phase of relative rotation. Further resistance is provided by the springs 18C after their respective clearances have been taken up. This relative rotation of the facing carrier assembly 15 around the hub 11 can continue with increasing torque until the collars 29 abut the ends of the apertures 34 in the hub flange 12. These second and third phases of relative rotation are represented by the portions II and III respectively, of the curve in FIG. 5.

(d) If the torque load is now reversed and the facing carrier assembly moved anticlockwise relative to the hub, the reverse sequence of events takes place and the plate then passes through its initial equilibrium position and goes into overrun.

The sequence of operation of the driven plate in the overrun mode is as described for the drive mode.

II (a) If the driven plate is rotating rapidly, say above 1000 revolutions/minute the speed of rotation and the eccentricity of the holes 30 in each collar 29, causes each collar 29 to be thrown radially outwards until its flat 32 engages with the flat 31 on the respective stop pin 17 (shown by dotted lines Z in FIG. 4).

(b) If the facings 16 are now subject to a torque load and rotate relative to the hub 11, then the carrier assembly 15 and the intermediate plate 25 increasingly resist relative rotation because of the centrifugal loading on the collars 29. Therefore, for the initial phase of rotation of the carrier assembly 15, the intermediate plate 25 moves with the facing carrier assembly so that rotation of the carrier assembly relative to the hub is resisted by the friction engagement between the intermediate plate 25 and the hub flange 12, and by the spring 18A. This is shown in dotted line as portion IV of the curve in FIG. 5.

(c) Continued relative clockwise movement will now result in the same mode of operation as previously described, bringing the springs 18B and 18c into operation.

(d) If the torque load is now reversed, the reverse sequence of events takes place, and the driving plate goes overrun as previously described. However, it should be noted that during that sector of deflection when the spring 18A is operating alone, the friction damping has been increased to provide a greater resistance to movement of the facing carrier around the hub 11.

III (a) With further increase of rotational speed the carrier plate 13 and intermediate plate 25 will become locked because of the centrifugal loading on the collar 29 locking the two flats 31 and 32 together.

(b) If the facings are now subjected to a torque load and rotated about the hub 11, the initial low torque movement will no longer occur and the mode of operation will include springs 18B and 18C only. Hence the torque versus deflection curve will comprise of portions II and III of FIG. 5 only and the torque axis T will be displaced accordingly.

(c) If the torque load is now reversed the reverse sequence of events takes place and the driven plate goes to overrun as previously described.

Figure 6:
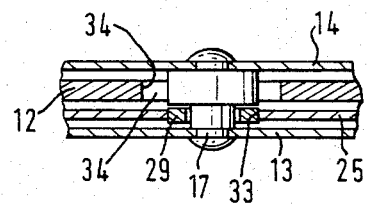
FIG. 6 is a section corresponding to FIG. 3 showing a modification to the driven plate shown in FIGS. 1 to 4.

In the modification shown in FIG. 6 the stop pin 17A and collar 29A are modified such that the collar extends into the aperture 33 of the intermediate plate 25 only and an enlarged portion of the stop pin extends into the aperture 34 of the hub flange 12. The driven plate incorporating this modification operates in a manner similar to that described above except that only the operation of the intermediate plate varies with rotation speed to alter the friction damping characteristics and there is no alteration to the operation of the low rate spring 18A. This construction has the advantage of being mechanically stronger, since the hub flange aperture 34 can contact the stop pin 17A direct and the stop pin is itself sturdier.

Although the intermediate plate 25 is shown interposed between the carrier plate 13 and the hub flange 12, it may instead be interposed between the retainer plate 14 and the hub flange. Alternatively, two intermediate plates may be provided, one on each side of the hub flange.

I claim:

1. A friction clutch driven plate comprising:
    a hub;
    a hub flange fast with the hub;
    a friction facing carrier assembly mounted for limited rotation relative to the hub, said carrier assembly including at least one flange;
    friction damper means for damping said relative rotation and includng an intermediate plate located for friction engagement with the hub and having an aperture therein;
    spring windows in the carrier assembly flange and the hub flange;
    damping springs in the spring windows for controlling rotation of said carrier assembly relative to the hub;
    a pivot pin mounted on the carrier assembly;
    and a centrifugal force responsive pendulum device comprising a collar having a cylindrical outer periphery and an eccentric pivot hole by which the pendulum device is pivotable on said pivot pin;
    the outer periphery of the pendulum device cooperating with the aperture in the intermediate plate to vary the operation of said friction means in response to variations in the rotational speed of the driven plate whereby the friction damping at higher speeds is increased compared with that at lower speeds.

2. The driven plate of claim 1, wherein the pivot hole and pivot pin each has a flat surface, which surfaces are brought into mutual engagement by centrifugal force acting on the collar.

3. A driven plate according to claim 1, wherein the carrier assembly includes a second flange and the hub flange includes apertures therein, stop pins extending between the carrier assembly flanges and co-operating with the apertures in the hub flange, at least one of the stop pins acting as the pivot pin for the pendulum device.

4. A driven plate according to claim 3, wherein the pendulum device co-operates with the corresponding aperture in the hub flange.

5. A driven plate according to claim 4, wherein the circumferential clearance between the pendulum device and the aperture in the hub flange is greater than that between the pendulum device and the aperture in the intermediate plate.

6. A driven plate according to claim 3, wherein the intermediate plate is interposed between one of the flanges of the carrier assembly and the hub flange.

7. A driven plate according to claim 6, wherein a high friction washer is interposed between the intermediate plate and the hub flange.

8. A driven plate according to claim 6, wherein the intermediate plate includes windows for the damper springs, the damping springs including a low rate spring which is a snug end fit in the corresponding windows in said flanges and in the intermediate plate and higher rate springs which are each a snug end fit in the corresponding windows in the carrier assembly flanges and in the windows of the intermediate plate and have end clearance with the corresponding windows of the hub flange.

9. A driven plate according to claim 8, wherein the intermediate plate includes windows for the damper springs, the damping springs including a low rate spring which is a snug end fit in the corresponding windows in said flanges and in the intermediate plate and higher rate springs which are each snug end fit in the corresponding windows in the carrier assembly flanges and in the windows of the intermediate plate and have end clearance with the corresponding windows of the hub flange.

* * * * *